United States Patent
Lange et al.

(10) Patent No.: US 9,939,092 B2
(45) Date of Patent: Apr. 10, 2018

(54) CLAMP WITH A MOUNTING ELEMENT CONTENT

(75) Inventors: Frank Lange, Büdingen/Eckartshausen (DE); Detlef Henrich, Limeshain (DE); Mathias Krauss, Nidderau (DE)

(73) Assignee: NORMA GERMANY GMBH, Maintal (DE)

( * ) Notice: Subject to any disclaimer, the term of this patent is extended or adjusted under 35 U.S.C. 154(b) by 838 days.

(21) Appl. No.: 11/489,214

(22) Filed: Jul. 19, 2006

(65) Prior Publication Data
US 2007/0018063 A1    Jan. 25, 2007

(30) Foreign Application Priority Data
Jul. 22, 2005   (DE) .................... 20 2005 011 542 U

(51) Int. Cl.
F16L 33/00         (2006.01)
F16L 33/08         (2006.01)

(52) U.S. Cl.
CPC .................................. *F16L 33/08* (2013.01)

(58) Field of Classification Search
CPC ...................................................... F16L 33/08
USPC ....... 248/226.11, 227.1, 227.2, 227.3, 227.4, 248/316.1; 285/23, 252, 253; 24/274 R, 24/274 P, 274 WB, 279, 19, 20 LS
See application file for complete search history.

(56) References Cited

U.S. PATENT DOCUMENTS

| | | | | |
|---|---|---|---|---|
| 3,567,165 A * | 3/1971 | White | ...................... | F16L 3/12 24/274 R |
| 4,478,434 A * | 10/1984 | Little | ...................... | F16L 31/00 24/279 |
| 4,637,100 A * | 1/1987 | Ishihata | ................. | B65D 63/06 24/20 EE |
| 4,803,767 A * | 2/1989 | Obrecht | ............... | B21D 39/031 29/243.5 |
| 5,078,237 A * | 1/1992 | Grzesiak | ................. | F16D 65/04 188/250 H |
| 5,230,136 A * | 7/1993 | Cronn | ................. | B21D 39/031 29/243.5 |
| 5,309,607 A * | 5/1994 | Hohmann | ............... | F16L 33/02 24/20 CW |
| 5,499,430 A * | 3/1996 | Strazar | .................... | F16L 33/08 24/19 |
| 6,000,104 A * | 12/1999 | Mann | ...................... | F16L 33/02 24/20 R |
| 6,282,756 B1 * | 9/2001 | van Walraven | ....... | F16L 3/1008 24/19 |
| 6,530,609 B1 * | 3/2003 | Chatterton | .............. | F16L 33/03 285/23 |
| 6,942,253 B2 * | 9/2005 | Bowater | ................. | F16L 33/08 285/23 |

* cited by examiner

*Primary Examiner* — Todd M Epps
(74) *Attorney, Agent, or Firm* — Lucas & Mercanti, LLP; Klaus P. Stoffel

(57) ABSTRACT

A clamp with a clamp band and a mounting element which is connected to the clamp band. In a clamp band of the above-described type, this object is met by connecting the mounting element to the clamp band with a clinch connection. The clinch connection may have a polygonal cross-section. The clamp band and the mounting element may be formed of different materials at least in areas where they contact each other.

7 Claims, 1 Drawing Sheet

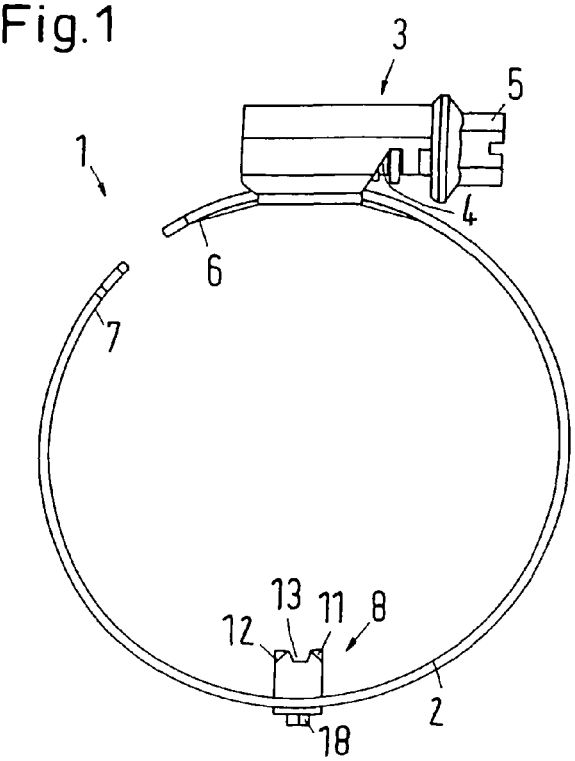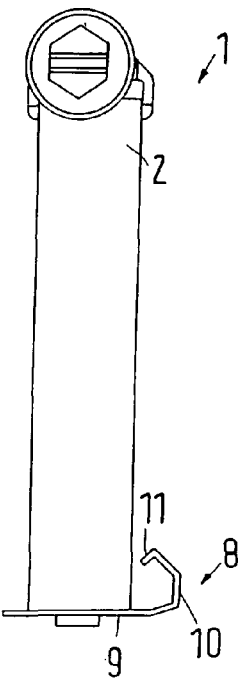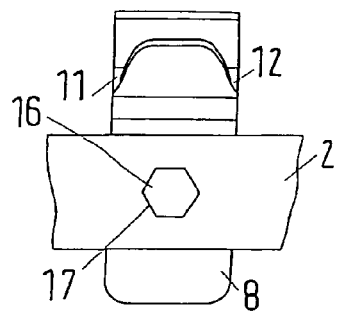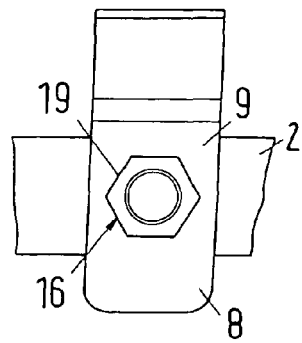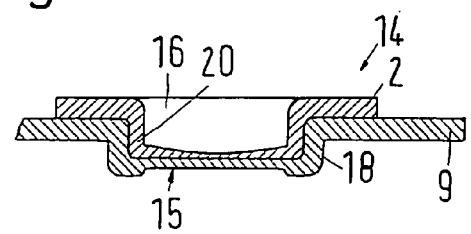

CLAMP WITH A MOUNTING ELEMENT CONTENT

BACKGROUND OF THE INVENTION

1. Field of the Invention

The present invention relates to a clamp with a clamp band and a mounting element which is connected to the clamp band.

2. Description of the Related Art

A clamp of the above-described type is used particularly for fastening a hose to a pipe piece or pipe end. For facilitating the assembly, it is known in the art to preposition the clamp relative to the hose. For this purpose, a mounting element can be used which is fixedly connected to the clamp. This mounting element, which maybe constructed, for example, as a clip, engages at the end face of the hose and holds the clamp in position at this location. For mounting the hose, it is then only necessary to simply push the hose over the pipe piece. The clamp can then be tensioned.

It is no longer necessary to mount the clamp on the hose at the location of use.

For fastening the mounting element to the clamp band, thermal methods are used predominantly. In other words, the mounting element and the clamp band are welded together, for example, by dot welding. While this connection is relatively simple, it requires that the clamp band and mounting element can be connected to each other by welding. This reduces, for example, the selection of possible materials.

SUMMARY OF THE INVENTION

Therefore, it is the primary object of the present invention to provide a clamp of the above-described type in which there are fewer limitations with respect to the connection of clamp band and a mounting element.

In accordance with the present invention, in a clamp band of the above-described type, this object is met by connecting the mounting element to the clamp band with a clinch connection.

In a clinch connection, two materials which are capable of being cold-formed are connected with each other without the need of heat, an adhesive or an auxiliary joining member. The two materials are placed in the form of two layers one on top of the other and are then connected to each other through a type of deep drawing process with subsequent upsetting of the drawn bottom. In other words, one layer of the material of the first element is formed into the position of the material of the other element. The clamp and the mounting member are then secured to each other through a frictional engagement.

In accordance with a preferred feature, the clinch connection has a polygonal cross-section. This achieves the additional result that the mounting element is not only connected to the clamp band through a frictional engagement, but that an additional positive engagement exists between the clamp band and the mounting element. This positive engagement counteracts any rotary torque existing between the mounting element and the clamp band. This causes the mounting element to be fastened to the clamp band so as to be secured against rotation. Consequently, any predetermined alignment between the clamp band and the mounting element is maintained.

In accordance with another preferred feature, the clinch connection has a hexagonal cross-section. A hexagon offers a sufficient resistance force against any occurring torque. Simultaneously, the relatively large angle between adjacent sections of a hexagon provides advantageous conditions for the flux of the materials.

A preferred feature provides that the clinch connection has an embossment which is formed on the outside. As mentioned above, a clinch connection results in the deformation of the two materials of the clamp band and the mounting element into a third dimension perpendicularly of the surface extension of the respective fastening sections of clamp band and mounting element. This deformation into the third dimension is not harmful to the hose to which the clamp is connected if the clamp protrudes outwardly. When the clamp is tensioned, the embossment is not pressed into the hose. The clamp band is preferably formed into the mounting element. Accordingly, the mounting element is also arranged on the outer side of the clamp band. This also ensures that the mounting element can be tensioned practically unchanged as compared to a clamp without mounting element.

The clamp band and the mounting element are preferably formed of different materials at least in areas where they contact each other. On the one hand, this results in cost savings. For example, the material of the mounting element can be selected by taking into consideration the function of the mounting element. This results in greater freedoms with respect to the construction of the clamp.

The clamp band is preferably manufactured of chromium steel. Accordingly, it is not necessary to use chromium nickel steel for a clamp with a mounting element.

The mounting element is preferably formed of a material having a smaller tensile strength than the clamp band. This makes it possible to further lower the manufacturing costs.

Preferably the clamp is constructed as a worm gear clamp and the mounting element is constructed as a prepositioning clip. In a worm gear clamp, it is advantageous if the clamp is secured on the hose during tensioning. This can be achieved in a simple manner by using the prepositioning clip.

The various features of novelty which characterize the invention are pointed out with particularity in the claims annexed to and forming a part of the disclosure. For a better understanding of the invention, its operating advantages, specific objects attained by its use, reference should be had to the drawing and descriptive matter in which there are illustrated and described preferred embodiments of the invention.

BRIEF DESCRIPTION OF THE DRAWING

In the drawing:

FIG. 1 is a side view of a worm gear clamp;

FIG. 2 is a front view of the worm gear clamp of FIG. 1;

FIG. 3 is a top view, on a larger scale, of the worm gear clamp as seen from the inside;

FIG. 4 is a top view, also on a larger scale, of the worm gear clap as seen from below; and FIG. 5 is a cross-sectional view of a clinch connection.

DETAILED DESCRIPTION OF THE INVENTION

As illustrated in the drawing, a worm gear clamp 1 includes a clamp band 2. A housing 3 is arranged in the area of an end of the clamp band 2. A tightening screw 4 with a head 5 is rotatably mounted in the housing 3.

The clamp band 2 has a first end section 6 which is arranged adjacent the housing 3, and a second end section 7 at the other end. The end section 7 has, in a known manner and therefore not illustrated, threaded elements in the form of approximately axial grooves formed in the clamp band 2. These grooves can be placed in engagement with the thread of the tightening screw 4. By turning the tightening screw 4, the worm gear clamp 1 is tightened.

A mounting element in the form of a prepositioning clip 8 is attached to the clamp band 2. The prepositioning clip 8 has a fastening section 9 which extends approximately perpendicularly of the circumferential direction of the clamp band 2. The prepositioning clip 8 is arranged on the radial outer side of the clamp band. The prepositioning clip 8 has a wall 10 which extends from the fastening section 9 radially inwardly (in relation to the clamp band 2 which is bent into a circle). The wall 10 continues into peaks 11, 12 which are bent back in the direction toward the clamp band 2. A recess 13 is provided between the peaks 11, 12.

The prepositioning clip 8 is connected to the clamp band through a clinch connection 14 which is illustrated in a sectional view in FIG. 5.

For manufacturing the clinch connection 14, the fastening section of the prepositioning clip 8 and the clamp band 2 are placed one on top of the other in such a way that the fastening section 9 is arranged on the outside. Subsequently, a suitable tool is used for carrying out a type of deep-process with a subsequent upsetting of the drawn bottom 15.

Used for the deformation is a die with a hexagonal cross-section, so that the clinch connection, as seen from the interior toward the clamp band 2, has a recess 16 with a hexagonal circumference 17. In a similar manner, a projection 18 with a hexagonal circumference is visible on the outer side of the fastening section 9 of the prepositioning clip 8. Accordingly, when the clinch connection 14 is produced, the clamp band 2 is provided with a projection 20 which is hexagonal in cross-section and which engages in the hexagonal projection 18 at the prepositioning clip 8. Since both projections 18, 20 are manufactured together, the materials of the clamp band 2 and the fastening section 9 rest on each other over the surfaces thereof within the clinch connection 14. Since the clinch connection 14 has a polygonal cross-section, particularly a hexagonal cross-section, not only a frictional engagement but also a positive engagement counteract the torques between the prepositioning clip and the clamp band 2.

Since it is now no longer necessary to use heat for mounting the two elements clamp band 2 and positioning clip 8, and an adhesive or other auxiliary joining members are no longer required, it is possible to use different materials for the clamp band 2 and the prepositioning clip 8. For example, the clamp band can be dimensioned in such a way that it has a tensile strength which is not necessary in the case of the prepositioning clip 8. It is no longer necessary to use chromium-nickel steel for the clamp band. It is now sufficient to use a simple chromium steel or even a simple steel.

While specific embodiments of the invention have been shown and described in detail to illustrate the inventive principles, it will be understood that the invention may be embodied otherwise without departing from such principles.

We claim:

1. A clamp comprising a clamp band and a mounting element connected to the clamp band, wherein the mounting element is arranged on an outer side of the clamp band and has a fastening section that extends perpendicularly to a circumferential direction of the clamp band, the clamp further comprising a clinch connection for connecting the mounting element to the clamp band, the clinch connection including an embossment on an outer side thereof, the embossment having a purely hexagonal cross-section, wherein the clamp band has a radially extending projection that engages in the embossment of the clinch connection so as to fix the mounting element to the clamp band and prevent rotation between the clamp band and the mounting element, wherein the radially extending projection has a perimeter that forms a hexagon.

2. The clamp according to claim 1, wherein the clamp band is deformed into the mounting element.

3. The clamp according to claim 1, wherein the clamp is a worm gear clamp and the mounting element is a prepositioning clip.

4. The clamp according to claim 1, wherein the clamp band and the mounting element are of different materials at least in areas thereof where they contact each other.

5. The clamp according to claim 4, wherein the clamp band is of chromium steel.

6. The clamp according to claim 4, wherein the mounting element is of a material having a lower tensile strength then the clamp band.

7. A clamp consisting of a clamp band, a mounting element connected to the clamp band, wherein the mounting element is arranged on an outer side of the clamp band and has a fastening section that extends perpendicularly to a circumferential direction of the clamp band, and a clinch connection for connecting the mounting element to the clamp band so as to prevent rotation between the clamp band and the mounting element, the clinch connection including an embossment on an outer side thereof, the embossment having a purely hexagonal cross-section, wherein the clamp band has a radially extending projection that engages in the embossment of the clinch connection so that the clinch connection provides a deformation of a material of the clamp band and a material of the mounting element that is perpendicular to a surface extension of the clamp band and the mounting element, wherein the radially extending projection has a perimeter that forms a hexagon.

* * * * *